United States Patent [19]
Briane et al.

[11] Patent Number: 4,806,744
[45] Date of Patent: Feb. 21, 1989

[54] IDENTIFICATION CARD READER ENCODER

[75] Inventors: Alain Briane, Paris; Michel Chevalier, Chevreuse; Joël Bouaziz, Ris Orangis, all of, France

[73] Assignee: Bull, S.A., Paris, France

[21] Appl. No.: 906,495

[22] Filed: Sep. 12, 1986

[30] Foreign Application Priority Data

Sep. 12, 1985 [FR] France ................. 85 13558

[51] Int. Cl.⁴ .......................................... G06K 13/00
[52] U.S. Cl. ..................... 235/477; 235/449; 235/479; 360/2; 360/71; 360/104
[58] Field of Search ............... 360/2, 71, 104, 109; 235/435, 449, 475, 477, 480

[56] References Cited

U.S. PATENT DOCUMENTS

| | | | |
|---|---|---|---|
| 3,296,605 | 1/1967 | Raddin et al. | 360/88 |
| 3,704,360 | 11/1972 | McFadden | 235/480 |
| 3,836,753 | 9/1974 | Pass | 235/449 |
| 3,909,595 | 9/1975 | Morello et al. | 235/435 |
| 4,042,807 | 8/1977 | Donabin et al. | 235/477 |
| 4,167,664 | 9/1979 | Pass | 235/449 |
| 4,181,920 | 1/1980 | Cerakas | 235/475 |
| 4,298,116 | 11/1981 | Niemeyer | 194/203 |
| 4,476,507 | 10/1984 | Koike et al. | 360/104 |
| 4,613,747 | 9/1986 | McCarthy | 235/477 |
| 4,616,128 | 10/1986 | Case | 235/475 |

FOREIGN PATENT DOCUMENTS

| | | |
|---|---|---|
| 0125655 | 11/1984 | European Pat. Off. . |
| 0134110 | 3/1985 | European Pat. Off. . |
| 2555213 | 5/1977 | Fed. Rep. of Germany . |
| 2356206 | 6/1977 | France . |

OTHER PUBLICATIONS

IBM Technical Disclosure Bulletin, vol. 20, No. 10, Mar. 1978, pp. 4091-4092.

Primary Examiner—A. D. Pellinen
Assistant Examiner—Jeffrey A. Gaffin
Attorney, Agent, or Firm—Lowe, Price, LeBlanc, Becker & Shur

[57] ABSTRACT

A card reader contains an admission chamber, a fixed guide path, including card feeding rollers, and a read station for a magnetic track of a data bearing identification card. The read station and idler wheel are on opposite sides of a card guide path. The read station comprises first and second heads, respectively mounted to turn about first and second parallel axes that extend in the same direction as the guide path. Shafts defining the first and second axes are mounted at the extremities of first and second swing arms positioned on opposite sides of the heads. The swing arms are mounted to turn about a third axis that extends toward the guide path. A shaft defining the third axis is carried on a bifurcated bracket, mounted to rotate about a fourth axis that also extends in the guide path direction. A tension spring exerts a force on the bifurcated bracket to hold the heads constantly against a face of the car as it travels through a nip formed between the heads and a drive roller.

10 Claims, 5 Drawing Sheets

IDENTIFICATION CARD READER ENCODER

TECHNICAL FIELD

The present invention relates to identification card reader encoders and more particularly to an encoder including a head mounted to pivot so information can be read from deformed cards.

BACKGROUND ART

Magnetic card readers, such as those described in U.S. Pat. No. 4,476,507, include feed rollers for driving identification cards wherein the rollers have a transverse axis of symmetry, i.e., symmetrical to the width of the card. The transverse axis of symmetry differs from the axis of symmetry of a head for reading data from the card. As a result, the card is fed asymmetrically, whereby the card tends to rotate inside of a guide therefor, to generate friction. To compensate for the friction the card is continuously held against a reference surface of a card guiding system. This structure introduces additional friction, resulting in card wear and requiring increased roller contact pressure on the card which also causes wear on the card.

U.S. Pat. No. 3,836,753 and European Patent Application No. 0,125,655 disclose card readers that compensate for differences in card thickness without affecting how accurately a magnetic track is read. Generally, these devices include a bracket supporting a magnetic head that is held against the card with a constant pressure by an elastic means for exerting tension against the card. To ensure that the data on the magnetic track of the card, even a deformed card, are read accurately by these devices, the contact pressure of the head on the card is increased. As a result the card wears more rapidly and there is faster deterioration of the magnetic track and read head.

DISCLOSURE OF INVENTION

An object of this invention is to obviate the above cited disadvantages of the prior art and to provide a card reader which is less costly to produce in economic terms.

This object is achieved by providing a card reader with an admission chamber, a fixed guide path with means to feed the card, and a station for reading the magnetic track of the card. The station is formed by a read head and a drive roller on opposite sides of the guide path. The magnetic track read heads comprise two units, each having at least one magnetic head mounted to rotate about first and second axes that extend in the same direction as the guide path. Shafts defining the first and second axes are mounted at the extremities of two swing arms positioned on opposite sides of the heads. The swing arms are mounted to turn about a third axis that extends in the same direction as the guide path on a bifurcated bracket which is mounted such that it rotates around a fourth axis parallel to the direction of the guide path. Tension is exerted on the bifurcated bracket by elastic means to hold the heads in continuous contact with the card during the course of its travel.

According to a further characteristic, the drive means are formed of rollers having a width sufficient to completely cover all components of the magnetic heads which present mechanical resistance to the card forward travel to prevent development of undesirable torque in an oblique direction relative to the desired rectilinear trajectory which extends in the same direction as the predefined path of a card through the reader.

There also exist so-called combination card readers for reading cards containing a magnetic track, or cards having an integrated circuit memory, or cards containing both a magnetic track and an integrated circuit. Such a reader is disclosed in European Patent No. 0,134,110. The reader disclosed in the application does not include an admission chamber for preventing potential fraud and confiscating illegal cards.

Another object of the invention is to obviate the above cited disadvantages.

According to an added feature, the cover plate of the reader comprises baffles formed of mating crenelations, i.e., interdigitated extensions and notches.

According to a further characteristic, the admission chamber contains a foolproof mechanism for preventing insertion of improper cards and the like.

According to a further feature, the guide path includes an extension with a card reading station containing an integrated circuit. The station is mounted to seal off the guide path. If a card is to be confiscated the station is retracted to open a passage that leads to a bin where the confiscated cards are stored.

According to another feature, an electromagnet controls retraction of the read head for the card reading station containing integrted circuits.

Another object of the invention is to provide a reader particularly adapted to read cards with a data strip extending in a direction at right angles to the direction a card is likely to be bent or deformed.

This object is achieved by translating the card relative to the reading means so (a) the reading means sequentially reads the successive data bits and (b) a longitudinally extending center line of the card and the reading means have a predetermined spatial relationship. The reading means includes a transducing head pivotally mounted on a first side of the longitudinally extending center line and a further member pivotally mounted on a second side of the center line opposite from the first side. The head and further member have separate card urging surfaces respectively on opposite sides of the center line. The card urging surfaces are adapted to abut against one face of the card. A drive roller having a circular periphery has an axis of rotation transverse to the direction of card translation. The circular periphery of the drive roller and card urging surfaces form a nip through which the card is translated. The head and further member are mounted to pivot about first and second axes on opposite sides of the center line; the first and second axes pivot in opposite directions about a third axis that is approximately aligned with the center line. The third axis is free to move back and forth relative to the first face. Spring means urges the third axis, as well as the card urging surfaces of the head and the further member, toward the first face of the card so portions of the card urging surfaces of the head and further member abut against the first face on opposite sides of the center line and the second face abuts against the roller periphery while the card is in the nip. Thereby the card urging surfaces generally conform with the first face of the deformed card.

The above and still further objects, features and advantages of the present invention will become apparent upon consideration of the following detailed description of one specific embodiment thereof, especially when taken in conjunction with the accompanying drawings.

BEST MODE FOR CARRYING OUT THE INVENTION

Figure 1:
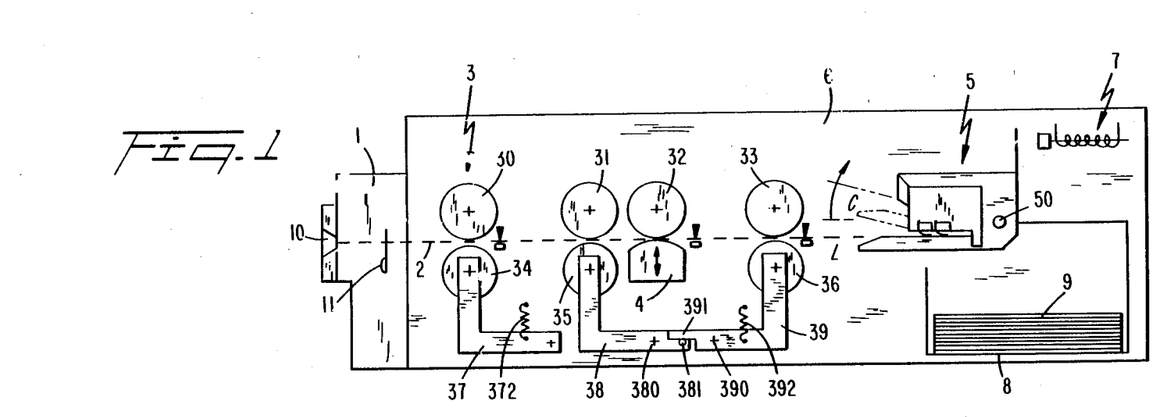
FIG. 1 is a schematic side view of a preferred embodiment of a reader of the present invention.

The card reader comprises in sequence an admission chamber 1, a guide path 2 along which a data bearing identification card 9, e.g., a credit card, travels and a magnetic read head 4. The card is driven by feed mechanism 3, first toward read head assembly 4 for a magnetic track on identification card 9, and subsequently toward read/write station 5 for data contained in a memory of an integrated circuit included in identification card, 9. The card reader thus accepts and reads (1) cards having magnetic tracks, (2) cards containing an integrated circuit, and (3) combination cards having both a magnetic track and an integrated circuit.

Card 9 has a tendency to be deformed or bent across the width thereof so that the elongated longitudinal edges thereof are not parallel. The magnetic tracks are formed on a magnetic strip that extends in the lengthwise direction of the card, i.e., at right angles to the axis about which the card is bent. Data bits are magnetically stored on the magnetic strip at successive locations along the tracks so the bits on the different tracks are sequentially read by separate heads in assembly 4 as card 9 travels past the heads. As each card to be read travels past assembly 4 there is a predetermined spatial relationship between a longitudinally extending center line of the card and the assembly.

Station 5 is mounted so it turns about pin 50; electromagnet 7 selectively contacts station 5 to pivot the station between positions L and C. With station 5 in position L information contained in the integrated circuit of card 9 is read; when station 5 is at position C the card is confiscated.

Feed device 3 includes drive rollers 30, 31, 32, 33 against which the card is applied by idler wheels or rollers 34, 35, 36; the idler rollers also apply the card against read head 4. Idler wheels 34, 35, 36 are respectively mounted on L-shaped arms 37, 38, 39, mounted to turn about spindles integral with plate 6. Tension is applied to arms 37–39 by tension springs 372 and 392 that function as an elastic means to maintain idler wheels 34–36 at a predetermined pressure against card 9 during its travel. Idler wheels 35 and 36 surround read heads 4 and are mounted on arms 38 and 39, in turn mechanically connected by pin 381 and a lever 391 such that as card 9 travels between rollers 35 and 31 rollers 36 and 33 are urged to be spread apart. This prevents braking action on card 9 as it leaves read head 4 when the card comes between the two rollers 33 and 36.

Confiscated cards are fed into bin 8 through conical aperture 10 (FIGS. 3A and 3D) and pushed toward sealing plate 11 by the customer.

Figure 2:
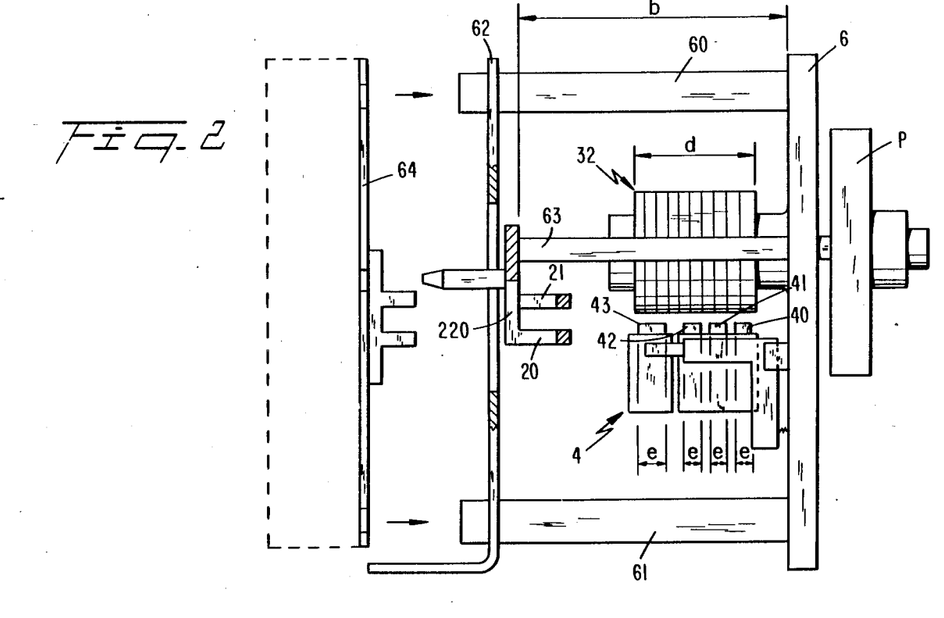
FIG. 2 is a front view of a guide path and feed mechanism of the reader illustrated in FIG. 1.

FIG. 2 is a transverse view of the card reader, i.e., a view taken in the direction the cards travel in the reader; the admission chamber has been removed from the view illustrated in FIG. 2. The reader includes mounting plate 6 for supporting the various components. Mounting plate 6 supports crosspieces 60 and 61. At the ends of crosspieces 60 and 61 remote from plate 6 plate 62 is mounted so it is parallel to plate 6; plate 62 holds printed circuit 64. Mounting plate 6 supports crosspieces 63 which maintain guide path 2 at a distance b from the mounting plate. Guide path 2 includes bifurcated bracket 220 containing prongs 20 and 21, having a gap between them that lies in a plane parallel to the axes of crosspieces 63 that extends between drive roller 32 and magnetic head 4. The plane parallel to the axes of crosspieces 63 is also between the peripheries of rollers 30–33 and idler wheels 34–36. Drive roller 32 has a minimum width d covering at least the full width e of all of magnetic read head components 4 which contact the magnetic cards. This prevents undesirable torque in an oblique direction relative to the desired rectilinear trajectory which is parallel to the predefined path of the card in the reader.

Figure 4A:
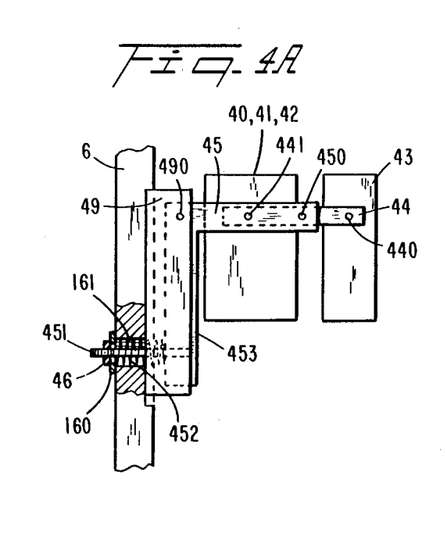
FIG. 4A is a side view of the read heads of the illustrated reader.
Figure 4B:
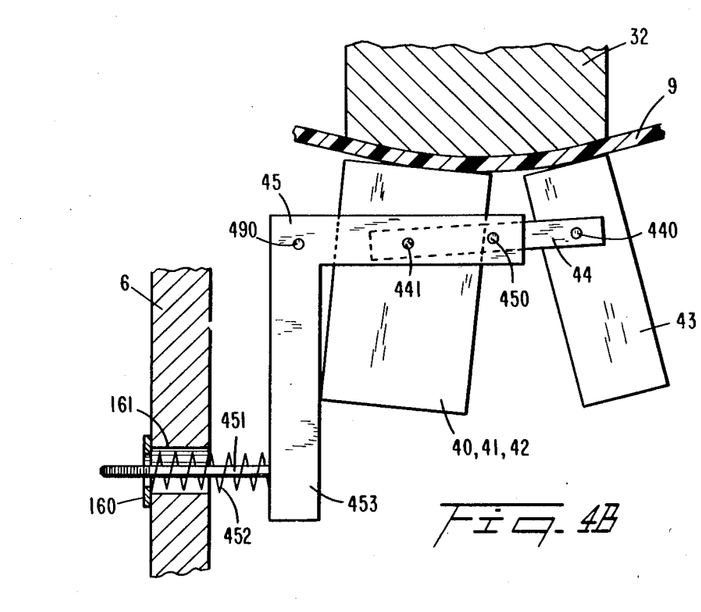
FIG. 4B is a side view, in the same direction as the card travel direction, of the read heads operating on a deformed card.

Assembly 4 comprises read heads 40, 41, 42 which are jointly mounted in a single unit and a fourth separately mounted read head 43. Head assembly 4 is mounted on two swing arms 44, positioned on opposite sides of heads 40–43, and by bifurcated support bracket 45 (only one of arms 44 is illustrated in FIGS. 4A and 4B). Head 43 is articulated about swing arms 44 by spindle 440, situated at one extremity of the swing arms, having a longitudinal axis parallel to the direction of the card guide path. Heads 40–42 are grouped in a single subassembly that is articulated about spindle 441, supported at the end of swing arms 44 opposite from spindle 440; the longitudinal axes of spindles 440 and 441 are parallel to each other.

At the end of bifurcated support bracket 45 is mounted spindle 450 which traverses the center of swing arms 44 such that the swing arms are articulated about bifurcated bracket 45. Bifurcated bracket 45 is in turn articulated about spindle 490, an integral part of two end plates 49 (only one of which is illustrated). Plates 49 are positioned on opposite sides of head 4 and are integral with mounting plate 6. Bifurcated bracket 45 has an L-shaped profile including leg 453 which does not support pivoting spindle 450. Leg 453 carries (1) threaded stud 451 which extends through bore 61 and a hole in plate 6, and (2) guide rod washer 60, integral with the plate. Aligned tension spring 452 passes through bore 61 and has opposite ends abutting against opposed faces of washer 60 and leg 453 of bifurcated bracket 45. As nut 46 is screwed onto stud 451 the play between heads 40–43 and drive roller 32 facing them is adjusted. Rollers 30 are mounted with ball bearings on a drive shaft (not shown) in turn driven by motor M (FIG. 5) through a system comprising a belt (not shown) and pulley P (FIG. 2). The various motor components, magnetic read heads, integrated circuit memory read head, and locking device are controlled by an electronic circuit on a printed circuit card integrally mounted on crosspieces 60 and 61.

Reference to FIG. 4B reveals the advantages of the magnetic read head assembly of the invention as it pertains to deformed card 9. Deformed card 9 is accurately read by read heads 40-44 because the linkage system between bifurcated bracket 45 and swing arms 44 causes the heads to abut against the corresponding magnetic tracks. A nip is thus formed between the periphery of roller 32 and surfaces of heads 40-42 and head 43 having surfaces that are urged against a first face of card 9 and roller 32 that abuts against a second face of the card. Heads 40-42 bear against the portion of the card first face on one side of the center line while head 43 is urged against the card first face on a second side of the center line. If the card does not include magnetic tracks on opposite sides of the center line, head 43 can be replaced by a member having a card urging surface. This system enables the tracks to be accurately read even if the card is deformed due to wear of feed roller 32, as illustrated in FIG. 4B.

Figure 3A:
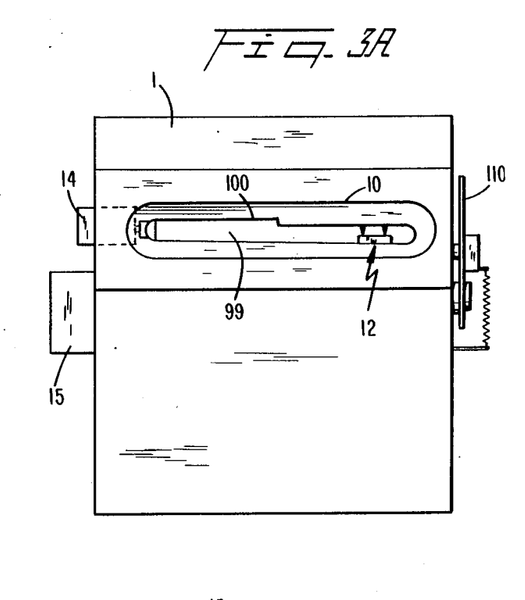
FIG. 3A is a front view of an admission chamber of the illustrated reader.
Figure 3B:
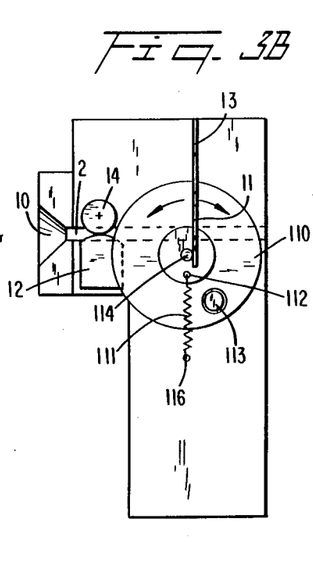
FIG. 3B is a side view of a sealer for the admission chamber.
Figure 3C:
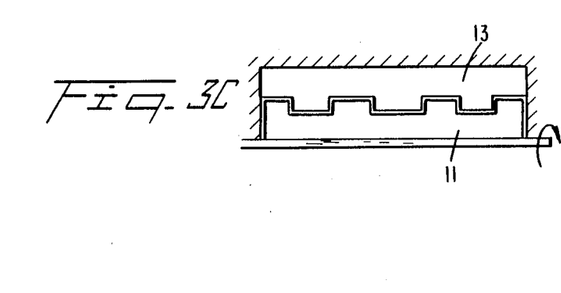
FIG. 3C is a rear view of a chamber sealing plate.

Admission chamber 1 is mounted such that it can move relative to plate 6, as illustrated in FIGS. 3A-3C. Chamber 1 includes an opening 10 shaped in a vertical cross-section as a truncated cone. Opening 10 has a mouth in a vertical face of chamber 1 through which card 9 is inserted. Opening 10 tapers in the vertical cross-section toward the back of chamber 1 to provide access for card 9 to guide path 2 into slot 99 having an asymmetrical notch 100. Notch 100 extends vertically on the left half of slot 99, as illustrated in FIG. 3A, to form a foolproofing mechanism for embossed magnetic cards. Behind foolproofing opening 10 is fixedly mounted a magnetic track detection system in the form of magnetic head 12. At the same height as magnetic head 12, positioned laterally relative to opening 10 through which cards 9 are inserted, is switch 14 to detect the width of the inserted cards.

Behind head 12 and switch 14, in the direction of forward movement of card 9, cover plate 11 is fixedly mounted on rotating spindle 114, at one end of which is fixedly mounted disk 110. Plate 11 is rocked back and forth between open and sealed positions for guide path 2. Opposite ends of compression spring 111 are connected to studs 112 and 116, respectively fixedly mounted on disk 110 and a wall of admission chamber 1 to urge cover plate 11 back to the position where it seals off guide path 2. The seal is provided by fixed plate 13 dovetailing with mobile plate 11. As illustrated in FIG. 3C, plates 11 and 13 have dovetailing crenelations, i.e., interdigitated gaps and extensions, to form anti-fraud baffles.

In disk 110 is an aperture through which lock bolt 113 is inserted; lock bolt 113 is an integral part of a piston core of an electromagnet (not shown). Conventional detector 15 determines whether disk 110 is locked. Detector 15 may, for example, be a switch to detect the electromagnet piston core position. In a conventional manner, when head 12 detects a card magnetic track and detector 14 signals that a correct card width has been detected, a conventional control system causes disk 110 to be unlocked by removing bolt 113 and the card inserted by the customer causes cover plate 11 to swivel. Because the length of admission chamber 1 in the direction of travel of card 9 is less than the card length, the card traverses the admission chamber and is then caught between feed roller 30 and idler wheel 34; thence, card 9 is fed by the device mounted on mounting plate 6.

Figure 3D:
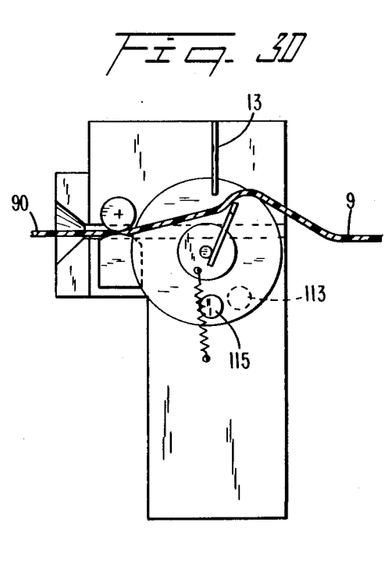
FIG. 3D is a side view of the sealing chamber in the case of attempted fraud.

In FIG. 3D is illustrated the advantage of the device for sealing chamber 1 in the case of attempted fraud wherein a fraudulent card 9 includes strip 90 made of flexible metal fibers that extend from one edge of the card 9; bank card 9 contains at least one microprocessor or integrated circuit system. Card 9 and flexible fiber strip 90 establish a communication link between contact regions 52 and a bank computer system to enable initiation of a detection sequence for a fraudulent card used by a malefeasor. If the card is fraudulent, fiber strip 90 and a baffle system formed by the cover plates 11 and 13 prevent disk 110 from returning to its closed position and consequently prevents insertion of locking bolt 113 into hole 115. In this case, the device detects that admission chamber 1 is not locked and it does not allow any transaction, consequently the malefeasor does not gain access to information in the bank system.

Figure 5:
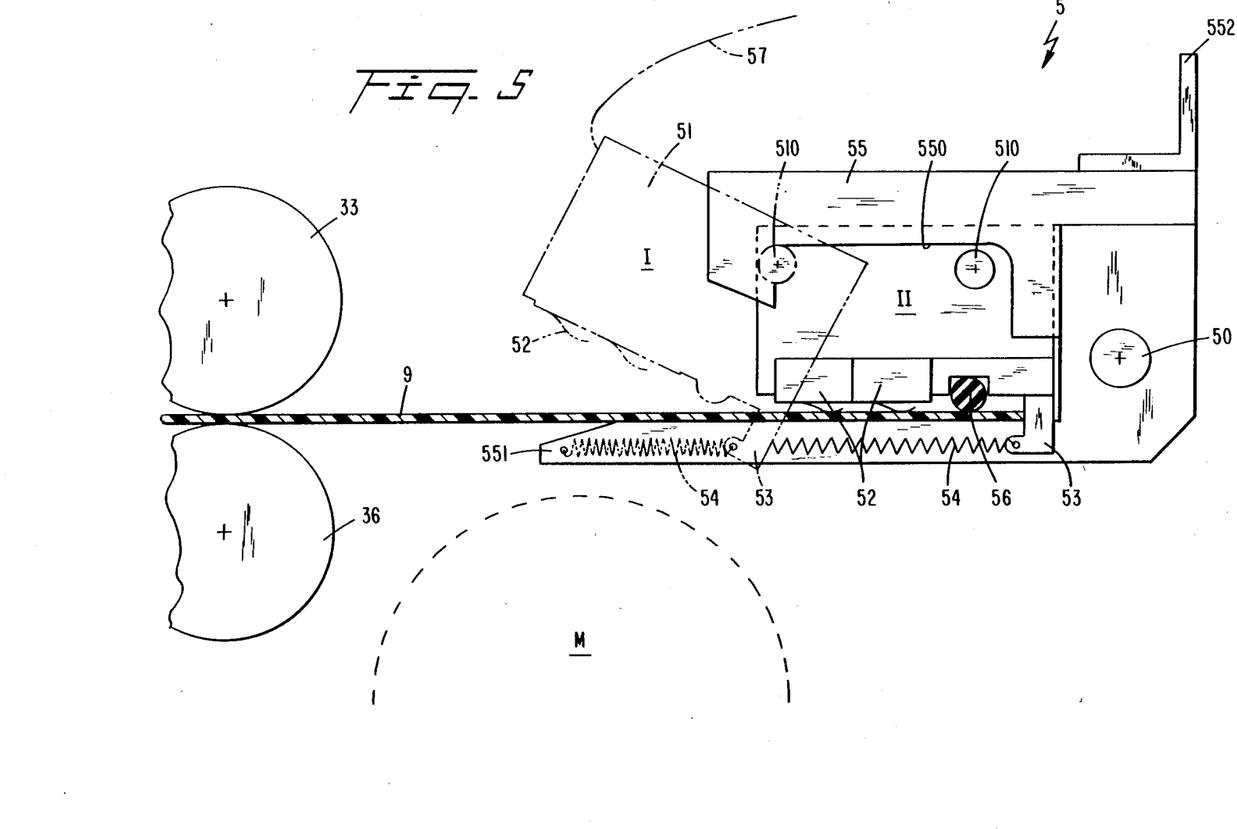
FIG. 5 is a side view of a read station including the integrated component.

In FIG. 5 is illustrated the condition of the reader when card 9 is introduced by feed roller 33 and idler wheel 36 into a slot in read device 5 for cards containing integrated circuits. This device comprises a mobile unit 51 that is translated back and forth in the direction of card travel and is rocked about an axis at right angles to the card travel direction. On the lower part of unit 51 is supported a series of electric contact regions 52 and a rubber ring 56 positioned in a groove such that the ring comes to rest against card 9 when read unit 51 is in the working position, represented by reference II. Read unit 51 is mounted to move within housing 55, articulated about pivoting spindle 50, which is an integral part of mounting plate 6. Housing 555 has a horizontally extending lower lip 551 that carries longitudinally extending tension spring 54, having opposite ends connected to a post on the free or forward extremity of lower lip 551 and to a post on the end of lug 53 at the lower rear part of read block 51. A lever or spindle 510 integral with read block 51 is mounted at the top rear part thereof to translate in cutaway 550 parallel to lip 551 in the same direction as card travel. Spindle 510 is mounted in housing 55 to guide the travel of unit 51 between idle position I and working position II.

Figure 6:
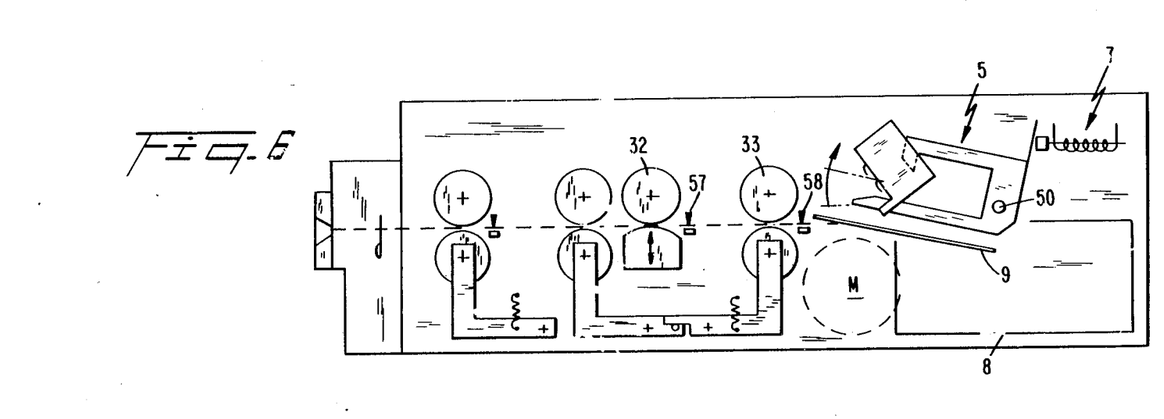
FIG. 6 is a side view of the reader during confiscation of a card.

While unit 51 travels between positions I and II, contact regions 52 travel across card 9 which causes self-cleaning of the involved contact surfaces on the card and of regions 52. Flexible cable strip 57, mounted on the forward face of unit 51, toward the top of the unit, provides electrical connections between contact regions 52 and the device (not shown) for processing the information contained in the integrated circuit of the card. Iron plate 552, integral with support 55, provides a low reluctance path for the core of electromagnet 7, to enable read assembly 5 to be swiveled about spindle 50 to an upper position wherein a card to be confiscated can be dropped through an opening in the top of card confiscation bin 8 (as illustrated in FIG. 6). Photoelectric sensors 57 and 58, positioned in the card path, determine the card position and enable the logic control circuit to initiate the various actions needed for operation of the reader.

The operation of the integrated circuit read station and of the card confiscation device is now described by referring to FIGS. 5 and 6. During normal operation with a combination card containing magnetic strip and integrated circuit memories, card 9 is pushed by its user so it crosses admission chamber 1, and is advanced along its path by rollers 30-33, driven by motor M.

Rollers 30 and 31 drive card 9 to and through magnetic track read station 4, thence the card is fed by rollers 32 and 33 toward integrated circuit read station 5. The card fed by rollers 32 and 33 comes to rest against lug 53 of read unit 51 which is in rest position I, FIG. 5. Card 9, being propelled by drive roller 33, causes read assembly 51 to be translated and rocked to working position II through the action of return spring 54. During this travel of assembly 51, contact regions 52 are driven so they abut against the contact points of the integrated circuit installed on card 9. When read unit 51 arrives at position II, drive motor M for rollers 30-33 is stopped in response to the read unit engaging a microswitch (not shown) mounted on station 5 at the end of the read unit travel. When the transaction has occurred in normal fashion, motor M is energized in the reverse direction to reverse the driven direction of rollers to feed backwards so it is returned to its owner.

At the end of the transaction, if the detecting device determines that the card is to be confiscated, the illustrated apparatus operates as follows. When the transaction is performed through electric cable 57 between the bank system and the integrated circuit on card 9, a command to activate drive rollers 30-33 in a special sequence is transmitted to the reader. In response to the command a clutch (not shown) between drive motor M and roller 33 is activated to reverse the rotation direction of only roller 33 so card 9 is extracted from a housing defined by lip 551 and the lower face of unit 51 including contact regions 52. If the card is to be confiscated, as soon as photoelectric sensor 58, positioned between roller 36 and block 5, detects the absence of the card, that is, when the card is at magnetic read station 4, logic circuitry in the electronic circuit mounted on plate 62 generates a command to activate electromagnet 7. Electromagnet 7, when activated, swivels block 5 into the confiscation position illustrated in FIG. 6. After block 5 has swiveled, a clutch (not shown) between the drive shaft of motor M and rollers 32 and 33 is activated, so that the rotation direction of the rollers is again reversed to cause card 9 to be fed by rollers 32 and 33 into confiscation bin 8.

While there has been described and illustrated one specific embodiment of the invention, it will be clear that variations in the details of the embodiment specifically illustrated and described may be made without departing from the true spirit and scope of the invention as defined in the appended claims.

We claim:

1. An identification card reader encoder comprising a card admission chamber, a read station for a magnetic track on a card supplied to the reader encoder via the card admission chamber, a fixed guide path including means for feeding cards from the admission chamber to the read station, the read station including a read head and drive rollers on opposite sides of the guide path to form a nip through which the card traverses, the magnetic track read head having first and second units, each having a magnetic head mounted to turn about parallel axes extending in the direction of card movement through the guide path, said axes being located proximate the ends of swing arms located on opposite sides of the head, means for mounting said swing arms to turn about another axis extending in the same direction as the card moves through the guide path, said mounting means including a bifurcated bracket mounted to turn about a further axis extending in the same direction as the card moves through the guide path, and elastic means mounted to apply tension on said bifurcated bracket for urging the head in abutting relation with the card during the course of the card travel.

2. The card reader encoder of claim 1 wherein the drive means includes rollers having a width sufficient to completely cover all of the magnetic head components that create a mechanical resistance to the forward travel of the card for preventing an undesirable torque in an oblique direction relative to a desired rectilinear card trajectory which is parallel to a predefined reader path.

3. The card reader of claim 1 further including a normally locked swiveled cover plate positioned to be activated by movement of the card through the guide path, means for unlocking the cover plate, wherein the admission chamber comprises means for detecting the width of the card, means for detecting the presence of a magnetic track on the card for controlling the unlocking means, and means for normally returning the swiveled cover plate to an equilibrium position wherein a locking operation may be implemented.

4. The card reader of claim 3 wherein the cover plate comprises baffles formed of crenelations.

5. The card reader of claim 3 wherein the admission chamber comprises a foolproofing notch in an entrance aperture through which the card passes.

6. The card reader of claim 1 wherein the guide path includes an extension containing a station for processing data on an integrated circuit of the card, the processing station being mounted and arranged to seal off the guide path and to be retracted in case of card confiscation to provide an open path through which a card is inserted into a confiscation bin located beneath the processing station.

7. The card reader of claim 6 further including an electromagnet for controlling retraction of the reader.

8. Apparatus for reading data encoded on cards likely to be deformed through a cross section in a direction at right angles to the direction successive data bits are written on a data containing strip on the card comprising means for reading the data on the strip, means for translating the card relative to the reading means so (a) the reading means sequentially reads the successive data bits and (b) a longitudinally extending line of the card extending in the direction of the strip and the reading means having a predetermined spatial relationship, the reading means including a transducing head pivotally mounted on a first side of the longitudinally extending line, a further member pivotally mounted on a second side of the longitudianally extending line opposite from the first side, the head and further member having separate card urging surfaces respectively on opposite sides of the longitudinally extending line, said card urging surfaces being positioned to abut against one face of the card, a drive roller having an axis of rotation transverse to the direction of card translation, the drive roller have an arcuate periphery, the arcuate periphery of the drive roller and card urging surfaces forming a nip through which the card is translated, and means for mounting the head and further member so the head and further member pivot about first and second axes on opposite sides of the longitudinally extending line and the first and second axes pivot in opposite directions about a third axis that is approximately aligned with the longitudinally extending line, the third axis being free to move back and fourth relative to the first face, and spring means for urging the means for mounting so the third axis, as well as the card urging surfaces of the head and the further member are urged toward the first face so portions of the card urging surfaces of the head and further member abut against the first face on opposite sides of the longitudinally extending line and a second face of the card on opposite the first face abuts against the roller periphery while the card is in the nip, whereby the card urging surfaces generally conform with he first face of deformed card.

9. The apparatus of claim 8 wherein the mounting means includes: an arm pivotable about a fourth axis parallel to said other axes, another member carried by said arm to pivot about said third axis, said another member including first and second studs respectively defining the first and second axes and on which the head and further member are pivotably mounted, the spring means being urged against the arm.

10. A method of reading data encoded on cards likely to be deformed through a cross section in a direction at right angle to the direction successive data bits are written on a data containing strip on the card comprising: reading the data on the strip with a transducer, translating the card relative to the transducer so (a) the transducer sequentially reads the successive data bits and (b) the transducer and a longitudinally extending line of the card extending in the direction of the strip have a predetermined spatial relationship, the transducer including a transducing head pivotally mounted on a first side of the longitudinally extending line, urging a surface of the head only against a portion of the card on the first side, urging a surface of a further member pivotally mounted on a second side of the longitudinally extending line opposite from the first side only against a portion of the card on the second side of the longitudinally extending line, pivoting the head and the further member about axes which extend in the direction the card is translated and which are on opposite sides of the longitudinally extending line while the head and further member surfaces are urged against the first and second sides.

* * * * *